US005499325A

United States Patent [19]

Dugan, Jr.

[11] Patent Number: 5,499,325

[45] Date of Patent: Mar. 12, 1996

[54] BRIGHTNESS CONTROLS FOR VISUAL SEPARATION OF VECTOR AND RASTER INFORMATION

[75] Inventor: Robert F. Dugan, Jr., Kingston, N.Y.

[73] Assignee: International Business Machines Corporation, Armonk, N.Y.

[21] Appl. No.: 474,526

[22] Filed: Jun. 7, 1995

Related U.S. Application Data

[63] Continuation of Ser. No. 932,865, Aug. 20, 1992, abandoned.

[51] Int. Cl.[6] .............................. G06T 5/00; G09G 5/06; G09G 5/10

[52] U.S. Cl. .......................... 395/132; 395/131; 395/161; 345/199; 345/147; 345/153

[58] Field of Search .................................... 395/132, 131, 395/161, 143, 135; 345/199, 153, 135, 147, 115, 113

[56] References Cited

U.S. PATENT DOCUMENTS

| | | | |
|---|---|---|---|
| 4,458,330 | 7/1984 | Imsand et al. | 364/900 |
| 4,646,076 | 2/1987 | Wiedenman et al. | 340/747 |
| 4,716,546 | 12/1987 | Beausoleil et al. | 364/900 |
| 4,808,988 | 2/1989 | Burke et al. | 340/744 |
| 4,816,814 | 3/1989 | Lumelsky | 340/747 |
| 4,853,681 | 8/1989 | Takashima | 345/199 |
| 4,965,574 | 10/1990 | Fukushima et al. | 345/147 X |
| 4,996,645 | 2/1991 | Schneyderberg Van Der Zon | 395/161 X |
| 5,103,407 | 4/1992 | Gabor | 395/131 |
| 5,235,677 | 8/1993 | Needle et al. | 395/131 |
| 5,249,263 | 9/1993 | Yanker | 395/131 |
| 5,371,844 | 12/1994 | Andrew et al. | 395/161 X |
| 5,428,739 | 6/1995 | Maeda | 395/161 |

OTHER PUBLICATIONS

IBM Publication SH20-5621-04 entitled "Graphics Program Generator" Program Reference, Feb. 1990.

*Primary Examiner*—Raymond J. Bayerl
*Attorney, Agent, or Firm*—William A. Kinnaman, Jr.

[57] ABSTRACT

Methods and apparatus for aiding the user of graphics systems to visibly distinguish areas (images) on a display screen generated from raster data from areas on the same screen generated from vector data. An example of where the invention may be applied is in graphical systems in which geographic information is displayed with the graphic data being made up of both vector data (such as a set of points defining a road input to the system by the user via a digitizing tablet) and raster data (such as a photo image of the same road that is digitized via a scanner). The brightness of each data type (vector or raster) image being displayed may be modified by the user. In one embodiment of the invention, in response to user interaction with the system, the brightness of the raster data, the vector data, or both (and hence their images once displayed), may be modified by adjusting entries in color tables (or specific entries of a single color table) maintained for each data type. By changing the color specification entries in the color table(s), the vector and raster data subsequently output to a display can be distinguished based on the shift in brightness of the image appearing on the screen in response to the user action.

36 Claims, 9 Drawing Sheets

PRIOR ART FIG. 2

RASTER COMMAND draw_image (the Image)

VECTOR COMMAND(S)

set_color (SLOT 250)
draw_line (0,0,100,100)
draw_point (90,90)

BRIGHTNESS CONTROLS FOR VISUAL SEPARATION OF VECTOR AND RASTER INFORMATION

This application is a continuation of application Ser. No. 07/932,865, filed Aug. 20, 1992, now abandoned.

BACKGROUND OF THE INVENTION

FIELD OF THE INVENTION

The invention relates generally to geometric modeling systems that, with the aid of a digital computer, may be used to capture, manipulate, analyze and report data. Examples of such systems include geographical positioning systems (GPS), geographic information systems (GIS), computer aided design (CAD) systems and computer aided manufacturing (CAM) systems.

More particularly, the invention relates to methods and apparatus used in geometric modeling systems for visibly distinguishing areas (images) on a display screen generated from raster data from areas on the same screen generated from vector data. An example of where the invention may be applied is in graphical systems in which geographic information is displayed with the graphic data being made up of both vector data (such as a set of points defining a road input to the system by the user via a digitizing tablet) and raster data (such as a photo image of the same road that is digitized via a scanner).

According to the invention, the brightness of each data type (vector or raster) image being displayed may be modified by the user. In one embodiment of the invention, in response to user interaction with the system, the brightness of the raster data, the vector data, or both (and hence their images once displayed), may be modified by adjusting entries in color tables (or specific entries of a single color table) maintained for each data type.

By changing color specification entries in each color table (or the color specification of assigned data type entries within a single color table), the vector and raster data that is subsequently output to a display can be distinguished based on the shift in brightness of the image appearing on the screen in response to the aforementioned user action.

The invention is particularly useful in situations where, in an exemplary application, raster data may assume any color in a defined color spectrum; making vector data and raster data indistinguishable by, for example, reassignment of color designations.

The invention may also be used in computer graphic systems which are not geometric modeling systems per se, to generally support graphics processing functions.

DEFINITIONS

The following terms and phrases are used herein and defined as follows:

1. A "modeling system" is a system that may be used to process (capture and manipulate) real world data and events, and process abstract data based on real world data and events. Examples of modeling systems include, but are not limited to, geographical positioning systems (GPS), geographic information systems (GIS), computer aided design (CAD) systems and computer aided manufacturing (CAM) systems.

2. A "modeling coordinate system" is a coordinate system which maps out a space that can completely contain all of the spatial or geometric data that a user can process using a given modeling system, in terms of a user's own units (e.g., feet, miles, degrees, etc.).

3. A "database coordinate system" is a coordinate system that accommodates the storage of data from a users modeling coordinate system without the loss of accuracy.

4. A "device coordinate system" is a coordinate system which maps out the available space on a given device (for example, a display device), into which data may be mapped. The data may, for example, be supplied via user interaction with a display device, may be mapped from (or to) a modeling coordinate system and/or database coordinate system, etc.

5. A "vector" is a line with a starting position, length and direction.

6. "vector data" is defined as data consisting of lines from which intelligent information (e.g., length, direction, etc.), can be derived.

7. A "raster" is a matrix covering the entire map in a database.

8. "raster data" is defined as a type of discrete data consisting of points corresponding to picture elements (pixels), where a database map image formed from the raster is a set of horizontal raster lines each made up of individual pixels.

DESCRIPTION OF THE PRIOR ART

In present day modeling systems which are used, for example, for GIS, GPS, CAD and CAM applications, it is well known to represent geometric map data using vector and raster data structures.

Such modeling systems typically operate under the control of, or with the aid of, a digital computer. An example of one such system is the commercially available IBM 5080 computer system on which the commercially available Graphics Program Generator (GPG) software may be executed ("IBM" is a trademark owned by the International Business Machines Corporation). The GPG software is described in IBM publication number SH20-5621-04, entitled "Graphics Program Generator Program Reference", fourth edition, copyright 1990, hereby incorporated by reference to describe a present day, commercially available system (the combination of the IBM 5080 hardware and GPG software) within which the invention may be applied.

It is well known that computers that support modeling systems, computer graphics systems (such as the IBM 5080), etc. may be used to process both vector data and raster data. The most common data structure used to represent geometric map data is the vector, i.e., a line with a starting position, length and direction as defined hereinabove.

Vectors have no width, but may have attributes assigned to them. For example, in some GIS's, vectors may have attributes such as street names, pipe serial numbers, etc.

The vector data structure is the most popular geometric map data organization for several reasons. First, traditional cartographic methods use vector operations. As a result, there are a greater number of flexible, refined vector algorithms than there are raster processing algorithms.

Second, many GIS users have made substantial commitments to vector data organization for geographic map data because of the large number of vector data bases already in existence. In addition, many of these same users have invested in vector based hardware such as tablet digitizers, vector plotters and DVST technology.

Still further, since a vector description is a shorthand notation as compared to the alternative of providing the coordinates of every identifiable point between the end points of a line, vector notation greatly reduces the amount of data the must be stored in a computer to describe a line.

On the other hand, raster data structures are also very useful for organizing geometric map data. Features are stored in such a data structure in terms of their component points (pixels). The map image is formed from the raster; a set of horizontal raster lines each made of individual pixels. Simply stated, the raster is a matrix covering all or a portion of the map in the data base. Almost all modern graphics and automatic data capture systems use raster technology.

Since the number of well developed vector processing algorithms in existence today exceed the number of raster processing algorithms, raster data is often converted to vector format for processing purposes. On the other hand, for display purposes, vector data is often converted to raster format i e., is "rasterized" for output to matrix plotters, raster television systems and the like.

Display systems are well known which can accommodate the concurrent display of both vector and raster data. One example of a display system that facilitates outputting and displaying both vector and raster data simultaneously is taught by Imsand et al in U.S. Pat. No. 4,458,330.

In the Imsand et al reference, by way of example, a raster television system is used as an output display device and vector data is converted to raster format prior to being output to the display device.

Once converted to raster data, there is no way taught or suggested in the Imsand et al reference for the user to distinguish which portion of the output was generated from the raster data and which portion of the output was generated from the vector data when both data types (with the vector data having been converted to raster format) are simultaneously viewed.

Beausoleil et al in U.S. Pat. No. 4,716,546, teaches a system capable of displaying both vector and raster data on a display subsystem cathode ray tube. The Beausoleil et al reference specifically teaches a display memory organization optimized for the writing and displaying of vectors on the display system where the refresh memory system is directed to a raster scan organization with the display being divided into pixels which are updated line by line.

Once again, although capable of displaying both vector and raster data simultaneously, the user has no way of distinguishing whether the data being displayed was originally vector or raster data.

In addition to the cathode ray tube display systems taught in the above referenced patents in which a beam is caused to trace a repetitive pattern of parallel scan lines and the information is presented by intensity modulating the electron beam at the appropriate points along each line (i.e., a raster display system), stroke written cathode ray tube displays are known which trace the shape of figures to be presented by deflection of an electron beam in a manner which connects a successive sequence of strokes, which may be straight or curved.

Further yet, hybrid cathode ray tube displays are also known which include a conventional stroke vector generator and a conventional raster symbol generator to sequentially supply a CRT with a picture that includes both raster and stroke vector information.

One such hybrid display system, taught by Grothe in U.S. Pat. No. 4,631,532, includes apparatus for superposing a raster symbol display and a vector symbol display on a single cathode ray tube. In an improvement to Grothe as set forth by Grothe et al in U.S. Pat. No. 4,635,050, a masking technique is taught in which the display is energized by the stroke vector signals and responds preferentially to a priority symbol allowing a portion of the display to be masked within selected regions.

According to the Grothe et al reference, the display is sequentially and alternately energized by the stroke vector positional signals and the raster symbol character signals, thereby providing a display comprised of a raster symbol character display superimposed on a stroke vector display, with the raster disposed to preferentially mask stroke vector characters of lesser priority.

By masking the stroke vector signal at the point of intersection with a raster scan line, the stroke vector display may be blanked in selected areas, with a raster scan optionally superimposed thereon (and vice versa).

Although the Grothe and Grothe et al references teach display systems which facilitate the concurrent visualization of vector and raster type data, there is no way of distinguishing between the two data types other than to use the computationally intensive and hardware oriented blanking scheme taught in Grothe et al (i.e., to suppress one data type on a priority basis while allowing the other type to be displayed in instances where an overlap occurs). The blanking scheme requires special purpose hardware which is expensive and not easy to retrofit into systems not designed to support the blanking and clipping processes.

Burke et al, in U.S. Pat. No. 4,808,988, in the context of describing a digital vector generator for a graphics display system, teaches the use of a color map to convert video data output to a display to a predetermined three color RGB (Red/Green/Blue) representation with 8 bits maximum per color. The color map allows a particular intensity and hue to be assigned sequentially to each pixel being illuminated on the display surface.

The aforementioned IBM 5080 computer system is a commercially available example of a computer system having a graphics subsystem that utilizes a color map to specify colors for both vector and raster data being output to a display.

Since many types of graphics data (such as GIS graphics data) consists of both vector and raster information (where both types of information can cover the same geographic region in the GIS example); it would be desirable to be able to visibly distinguish areas on a display screen generated from raster data, from areas on the same screen generated from vector data.

Visually, the images of raster and vector data displayed on a screen do not always complement each other. Often it is hard to tell where an image generated from vector data leaves off and an image generated from raster data begins. By having the capability to visually separate graphics data images to distinguish vector data images from raster data images, a user could, for example, check the accuracy of vector data against raster data (for instance, answer questions like "Did the road that was digitized from a map actually follow the image photograph of the road?); create vector data using the raster data as a reference (for instance, digitize a road directly on a graphics screen using an image photograph of the road); and create a frame of reference, a particularly useful tool in geographic areas where there is not a lot of vector data (in this case raster data can provide an excellent frame of reference).

In view of the prior art as exemplified by the aforementioned references, it would also be desirable to be able to visually separate images generated from raster data from images generated from vector data, on the same display screen, without having to use computationally intensive processes that consume system resources (in particular, CPU time), or require the use of expensive hardware to implement hardware oriented blanking and clipping techniques.

Furthermore, it would be desirable to be able to provide a technique for visually separating images generated from raster data, from images generated from vector data (on the same display screen), which do not clip or blank out any data from the screen, leaving all displayed data visible while distinguishing the two data types.

Still further, it would be desirable to be able to accomplish the aforementioned visual separation quickly and efficiently, in real time under user control, utilizing the existing display hardware configuration in a given modeling system or computer graphics system. In particular, it would be desirable to be able to accomplish the desired visual separation utilizing techniques that only need to modify color table entries for a given data type (vector or raster data), in response to user generated requests to change the brightness of a particular data type. Such techniques are easily implemented in software, are not computationally intensive and do not require the addition of expensive special purpose hardware to the underlying system.

SUMMARY OF THE INVENTION

Accordingly, it is an object of the invention to be able to provide methods and apparatus for visibly distinguishing areas on a display screen generated from raster data (raster data images), from areas on the same screen generated from vector data (vector data images).

It is a further object of the invention to be able to provide methods and apparatus for performing the aforementioned visual separation without having to use computationally intensive processes that consume system processing resources or require the use of expensive hardware to implement blanking and clipping schemes.

Furthermore, it is an object of the invention to be able to provide a methods and apparatus for visually separating images generated from raster data, from images generated from vector data (on the same display screen), which do not clip or blank out any data (i.e., suppress any displayed images) from the screen; as opposed to the use of techniques which suppress image generation to distinguish data type resulting in visual data loss.

Further yet, it is an object of the invention to be able to provide methods and apparatus which accomplish the aforementioned visual separation quickly and efficiently, in real time under user control, utilizing the existing display hardware configuration in a given modeling system or computer graphics system.

A still further object of the invention is to be able to accomplish the desired visual separation of vector and raster data type images utilizing techniques that are not computationally intensive, that are amenable to software implementation and do not require the addition of expensive special purpose hardware to the host system.

According to the invention, the aforementioned objectives may be achieved by using methods and apparatus which allow a user to control the brightness of each type of data image (vector and raster data images) appearing on a display device, via modification of the value of data type oriented color specification entries in the existing color table(s) in a given modeling or computer graphics system.

In accordance with one embodiment of the invention, a method is set forth for enabling images on a display screen generated from raster data to be visually distinguished from images on the same screen generated from vector data (in the context of a modeling system that includes dedicated color table entries for specifying the color of raster data and vector data), comprising the steps of: (a) controlling the brightness of raster data images on the screen in response to a first control signal generated by a first control means; and (b) controlling the brightness of vector data images on the screen, in response to a second control signal generated by a second control means.

According to a further aspect of the invention, the aforementioned step of controlling the brightness of raster data images in response to the first control signal includes the step of modifying all color table entries specifying the color of raster data in the system by a first adjustment factor. Likewise, the aforementioned step of controlling the brightness of vector data images in response to the second control signal includes the step of modifying all color table entries specifying the color of vector data in the system by a second adjustment factor.

According to a another aspect of the invention, the aforementioned first adjustment factor is added (subtracted) to the red, green and blue components of each color table entry specifying the color of raster data in the system to increase (decrease) the brightness of raster data; while the aforementioned second adjustment factor is added (subtracted) to the red, green and blue components of each color table entry specifying the color of vector data in the system to increase (decrease) the brightness of vector data.

A preferred embodiment of the invention contemplates the aforementioned first and second adjustment factors being variable quantities which depend on the magnitude of the first and second control signals, respectively. In accordance with an alternate embodiment of the invention, the first and second adjustment factors are fixed quantities.

Still another embodiment of the invention is directed to a method for distinguishing raster data display images from vector data display images in a modeling system in which both raster data and vector data display images are simultaneously viewable in the same display window, in the context of a system that includes a cathode ray tube (CRT) having a defined display window, a color table for storing color specifications assigned to data to be displayed on said CRT (wherein each color table entry is dedicated to specifying the color intensity of either raster data or vector data), a color manager for modifying color table entries in response to user input control signals, control means for inputting the control signals, a graphics manager for processing vector commands, and an image manager for processing raster commands.

According to this aspect of the invention, the novel method comprises the steps of: (a) predefining a first set of color table entries as vector data entries and predefining a second set of color table entries as raster data entries; (b) increasing the color intensity of the first set of color table entries via the color manager in response to a first control signal input to the color manager by the user via the control means; (c) decreasing the color intensity of the first set of color table entries via the color manager in response to a second control signal input to the color manager by the user via the control means; (d) increasing the color intensity of the second set of color table entries via the color manager in response to a third control signal input to the color manager by the user via the control means; and (e) decreasing the color intensity of the second set of color table entries via the color manager in response to a fourth control signal input to the color manager by the user via the control means.

Further steps in the embodiment of the invention, described immediately hereinabove include (a) periodically refreshing the CRT to display vector and raster images corresponding to the vector and raster commands processed by the graphics manager and image manager; and (b) updating the display to adjust the brightness of display images starting with a refresh cycle following the color intensity in said color table having been modified for at least one data type, thereby allowing a user to distinguish between vector data images and raster data images being displayed.

According to a preferred embodiment of the invention, the methods contemplated herein are easily implementable in software, with a visible control in the form of a dial widget or slider bar appearing next to the graphic field of view. By changing all of the color table entries for each data type in response to user inputs (via the dial widget or slider bar), the raster and vector data can easily be distinguished as presented on the display screen.

Further aspects of the invention are directed to apparatus for distinguishing raster data display images from vector data display images in a computer graphics system in which both raster data and vector data display images are simultaneously viewable in the same display window.

According to a preferred embodiment of the invention, such apparatus is incorporated into a system that includes a cathode ray tube (CRT) having a defined display window, a vector command processor and a raster command processor, where (in the system) a first set of color specifications are defined for raster type data and a second set of color specifications are defined for vector type data.

The novel apparatus in the context of this system comprises: (a) color specification storage means, for storing color specifications assigned to data to be displayed on the CRT, wherein each entry stored in the color specification storage means is dedicated to specifying the color intensity of either raster data or vector data and further wherein the color specification storage means is initialized with the first and second sets of color specifications; (b) user input control means for inputting a user request to the system, in the form of at least one brightness control signal, to change the brightness of at least one type of data image displayed on the screen; and (c) color specification modification means, for modifying color specification storage means entries in response to the at least one brightness control signal, operative to modify all the entries in the first set of color specifications stored in the color specification storage means whenever the at least one control signal indicates that the brightness of raster data is to be modified, and operative to modify all the entries in the second set of color specifications stored in the color specification storage means whenever the at least one control signal indicates that the brightness of vector data is to be modified.

Still other aspects of the invention are directed to more general methods for selectively controlling the brightness of raster data images and vector data images on a display device in any color graphics system that includes dedicated color table entries for specifying the color of raster and vector data types.

The invention features the ability to easily and independently control the brightness of raster and vector data images appearing on a display screen to assist a user in visually distinguishing between these two data types in modeling systems and computer graphics systems where images generated from the two data types can be simultaneously displayed.

As indicated hereinbefore, an example of one such system is the IBM 5080 running GPG software. This GIS allows both raster data and vector data to be placed into a frame buffer before generating the corresponding raster and vector data images on a CRT, thereby allowing both types of data to be simultaneously displayed. The aforementioned GIS uses the convention that vector data is placed into the frame buffer after raster data for each frame to be displayed so that the vector data (usually in the form of line segments) is not overwritten by the raster data (usually in the form of patterns that would obliterate underlying vector data). This convention is assumed to be followed in any system employing the invention that allows both data types to be written to a single frame buffer before generating the data images on a CRT.

Further features of the invention include being able to perform the aforementioned visual separation without having to use computationally intensive processes that consume system processing resources or require the use of expensive hardware to implement blanking and clipping schemes; enabling a user to visually separate images generated from raster data from images generated from vector data (on the same display screen), while not clipping or blanking out any data; and being able to accomplish the aforementioned visual separation quickly and efficiently, in real time under user control, utilizing the existing display hardware configuration in a given modeling system or computer graphics system, using techniques that are amenable to software implementation and which are easy to retrofit into existing commercially available graphics systems.

These and other objects and features of the present invention and the manner of obtaining them will become apparent to those skilled in the art, and the invention itself will be best understood by reference to the following detailed description read in conjunction with the accompanying Drawings.

BRIEF DESCRIPTION OF THE DRAWINGS

FIG. 3 depicts portions of a commercially available Geographic Information System (GIS) in which the invention may be practiced.

FIG. 4 depicts color specification modification means (the depicted "color manager") which, according to the teachings of the invention, can be made to respond to user input signals to alter the color specifications for raster data and/or vector data maintained in a color table.

DETAILED DESCRIPTION

Figure 1:
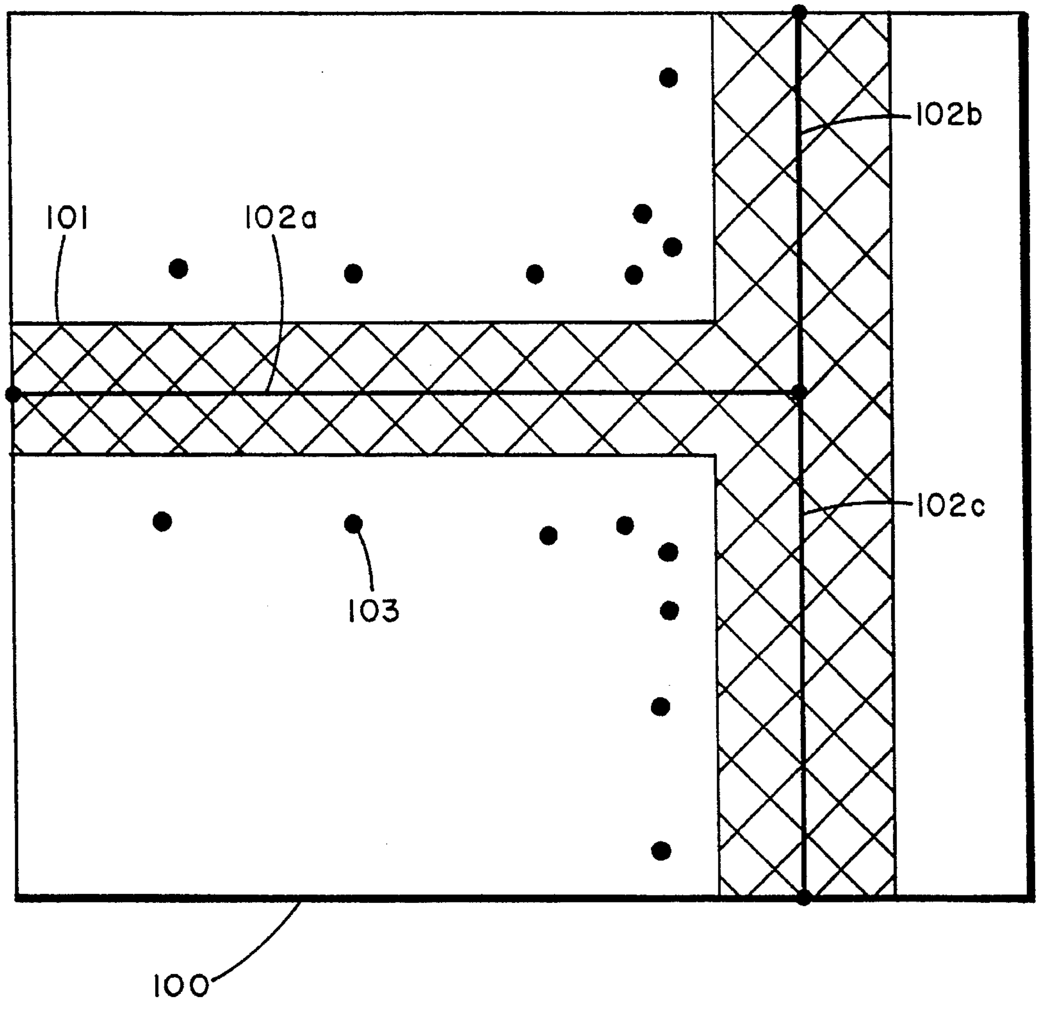
FIG. 1 depicts an example of the raster data image of a road being displayed on a screen (e.g., a cathode ray tube), together with a vector data image of the same road.
Figure 2:
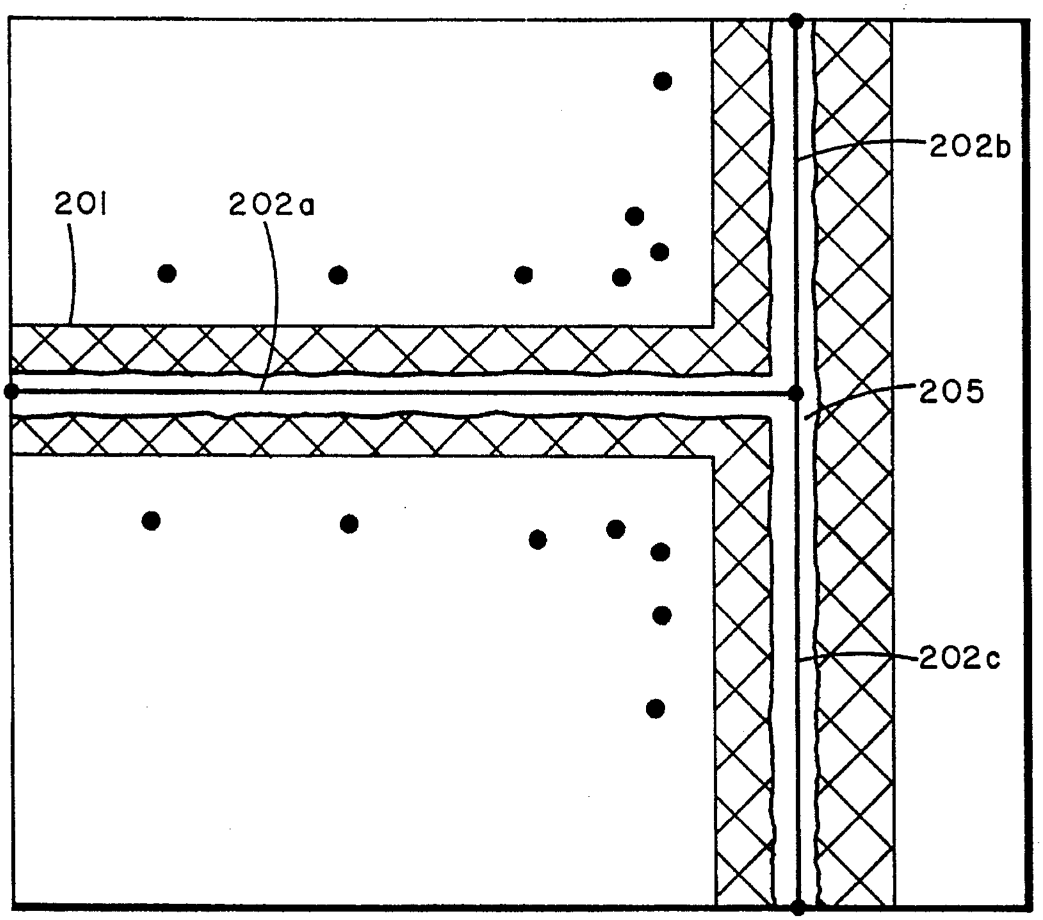
FIG. 2 depicts how prior art masking techniques (hardware oriented blanking or clipping schemes) can be used to visually separate and highlight the vector data image from the raster data image depicted in FIG. 1.

FIGS. 1–2 illustrate the type of problem that can be solved utilizing the present invention.

FIG. 1 depicts an example of the raster data image of a road (cross-hatched data image 101), being displayed on display surface 100 together with a vector data image of the same road (line segments 102*a*, 102*b* and 102*c*). The other symbols appearing on display surface 100 in FIG. 1, such as the feature labeled 103, are meant to represent structures adjacent to the depicted roadway such as trees, etc.

The convention of placing raster data into a frame buffer, followed by placing any vector data to be displayed into the same frame buffer, is assumed to have been followed. Normally, such a buffer is "flushed" after the images to be displayed are generated. The buffer is then normally refilled during the next display cycle, in accordance with well known graphics processing techniques, to implement display commands that have been input to the system.

Assuming, for example, that raster data can be any color in a defined color spectrum, it would be impossible to visibly distinguish the raster data image from the vector data image depicted in FIG. 1, based on color alone. This is an example of one type of problem solved by the present invention.

A prior art approach for highlighting the vector data is, as indicated hereinbefore, the use of hardware oriented blanking and clipping techniques, such as those taught in the aforementioned Grothe et al reference. Utilizing such techniques, a region surrounding the vector data image could be "blanked out" (shown as region 205 in FIG. 2), thereby highlighting the vector data image (line segments 202*a*, 202*b* and 202*c* corresponding to line segments 102*a*, 102*b* and 102*c* in FIG. 1), at the expense of losing some of the previously visible raster data image (101 in FIG. 1), shown as raster data image 201 in FIG. 2.

The invention described herein allows the vector data image in FIG. 1 to be visually distinguished from the raster data image of FIG. 1 without requiring the use of any special purpose hardware or requiring the aforementioned hardware oriented blanking and clipping techniques to be applied. Consequently, the aforementioned data loss problem can also be solved by utilizing the present invention.

According to the invention, the raster data image and vector data image depicted in FIG. 1 are distinguished by controlling the brightness of each data type being displayed.

According to a preferred embodiment of the invention, the brightness of each data type can be controlled independently, with each data type image being made brighter, dimmer or held at the same intensity, under user control. Alternatively, the invention also contemplates systems where the user controls the intensity of both data types in a dependent fashion, i.e., whenever the intensity of the image corresponding to one data type is intensified, the other data type image is automatically reduced in intensity.

These and other embodiments of the invention will be explained in greater detail hereinafter following a brief description (set forth for the sake of completeness) of an exemplary geometric modeling system, a GIS, (described with reference to FIGS. 3–5), in which the invention may be used.

Figure 3:
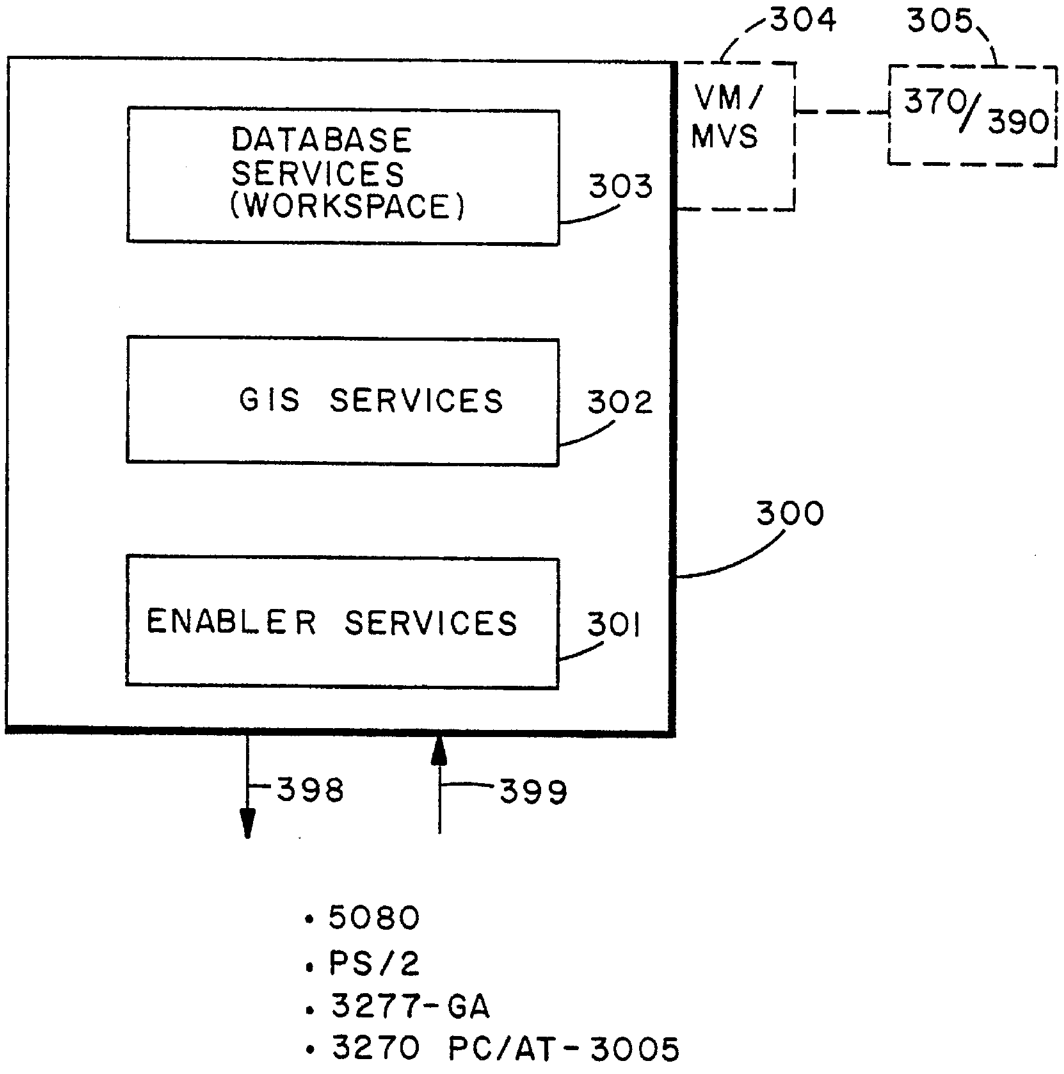
FIG. 3 depicts in block diagram form the elements of an exemplary prior art modeling system in which the invention may be advantageously used. In particular.

Reference should now be made to FIG. 3 which depicts in block diagram form the elements of the exemplary GIS. Such systems are well known by those skilled in the art.

The exemplary GIS system depicted in FIG. 3 may be realized by a combination of the aforementioned GPG software, as described in the previously incorporated reference, and, for example, the aforementioned IBM 5080 computer system, operating in a IBM System 370/390 environment. The GPG software, IBM 5080 and IBM 370/390 computers referred to hereinabove are all commercially available hardware and software products.

Other computer systems that can support the illustrative GPG GIS system in the exemplary system 370/390 environment include commercially available IBM PS/2 products, the IBM 3277-GA and the IBM 3270 PC/AT-3005. Each of the aforementioned products typically include a display (CRT), mouse, optional digitizer, and keyboard for allowing the user to interface with GIS 300 (as depicted in FIG. 3) via the Enabler Services 301 portion of GIS 300, also depicted in FIG. 3 and described in greater detail with reference to FIG. 4.

Commercially available software packages, such as Microsoft Windows Version 3.1 ("Microsoft" and "Windows" are trademarks of the Microsoft Corporation), running on, for example, the IBM PS/2 (shown coupled on links 398–399 to GIS 300 in FIG.3), can be used to present the user with slider bars, dial widgets, etc. (displayed on the CRT), and serve as an example of an interface between the user and the Enabler Services 301 portion of GIS 300 for supporting the invention being described herein.

Generally speaking, the Enabler Services 301 portion of a GIS system (like GIS 300), services input/output requests between the user and the rest of the GIS system. The Enabler Services 301 portion of exemplary GIS 300 (depicted in greater detail in FIG. 4), is shown (in FIG. 4) to include (1) digitizer manager 401; (2) graphics manager 402; (3) an image manager 403; (4) process manager 404; (5) language manager 405; (6) color manager 406; (7) printer manager 407; and (8) scanner manager 408. Managers 401–408 (i.e., managers capable of performing the functions ascribed to each of the aforementioned managers, all of which are discussed hereinafter), are commercially available having been implemented as part of the GPG software referred to hereinabove and in other graphics systems.

Digitizer manager 401 (in the GPG context) is used to collect information (vector type data) from a digitizing tablet and input the information into GIS 300. In the same context, graphics manager 402 is used to manage the input/output of vector data to/from a display screen; image manager 403 is used to manage the output of raster data to a display screen; process manager 404 is used to manage all communication and programs in the entire GIS 300; language manager 405 is used to interpret applications programs; color manager 406 is used to control screen color; printer manager 407 is used to output information to a printer; and scanner manager 408 is used to manage the input of raster data to the GIS.

The next portion of GIS 300 depicted in FIG. 3 is the hardware and software making up GIS Services portion, 302 of the system. Several typical GIS Services, such as those provided by the aforementioned GPG software, are identified and will be explained in greater detail hereinafter with reference to FIG. 5. For now it is sufficient to say that these services could be, for example, CAD/CAM services, GPS services, accounting services, etc., and involve (1) the capture of data (for example, a mouse pointing to a river bed and tracing the river over a screen); (2) the manipulation of data (for example, moving a road on a map, moving the location of a fire hydrant, etc.); (3) the analysis of data (such as solving minimum distance determination problems); and (4) reporting the results of GIS Services processing (for example, generating a report, plotting points and/or drawing points on a display screen, etc.).

FIG. 3 also depicts a Database Services portion 303 of GIS 300, which manages work space (also contained within Database Services portion 303 of GIS 300) allocated to the GIS Services portion 302 of GIS 300; and an operating system 304 (such as, for example, the commercially available VM or MVS operating system), for managing the interface between GIS 300 and a host computer (a main frame interactive product), such as the aforementioned IBM System 370/390 computer (shown at 305 in FIG. 3).

Figure 5:
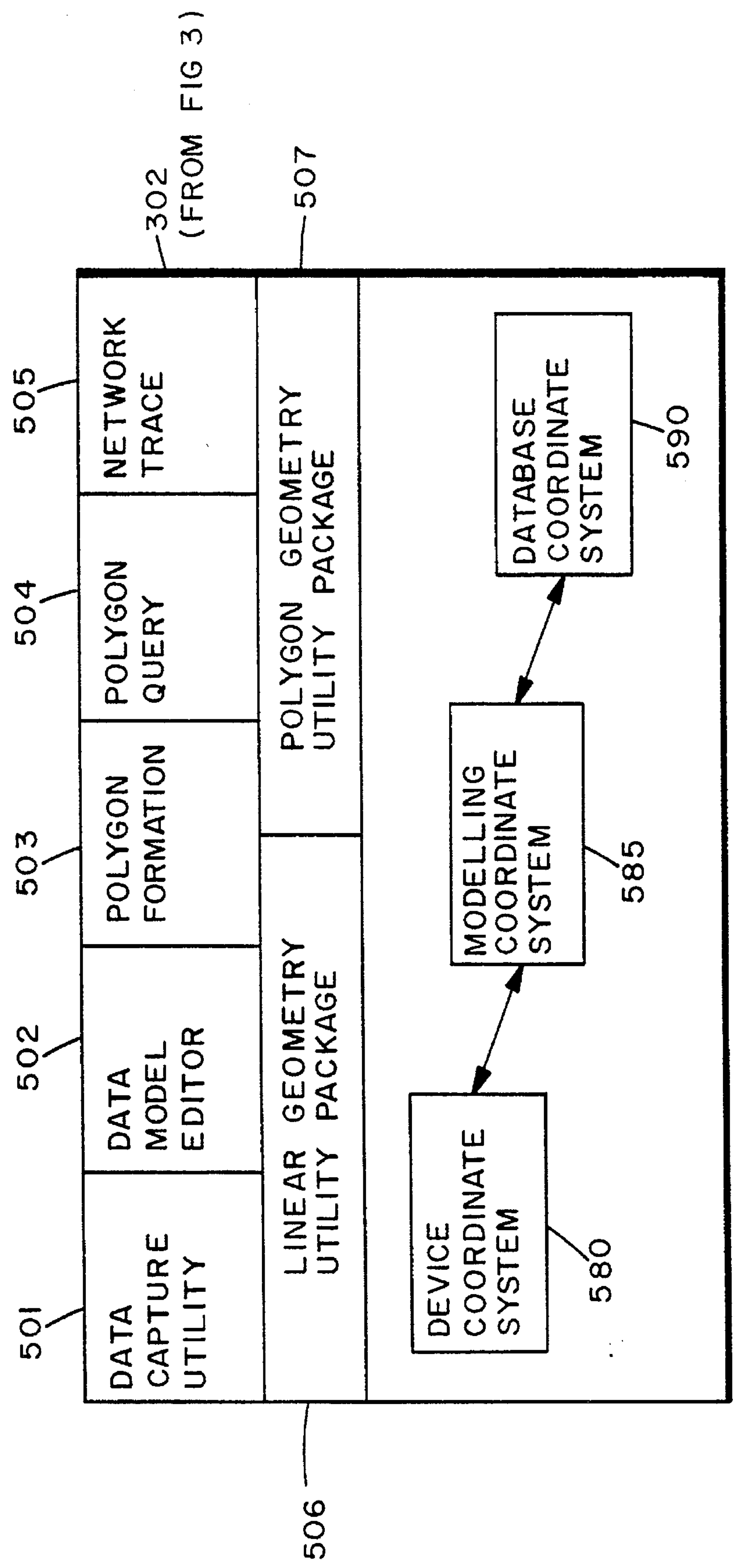
FIG. 5 depicts in greater detail the GIS Services portion of exemplary GIS system depicted in FIG. 3.

As indicated hereinabove, FIG. 5 depicts in greater detail the GIS Service portion (portion 302 in FIG. 3) of the exemplary GIS system 300 depicted in FIG. 3. The exemplary GIS Services portion 302 is shown to include (usually in the form of software) a data capture utility (501); a data model editor (502); polygon formation and polygon query sections (503 and 504, respectively); a network trace section (505); linear and polygon geometry utility packages (506 and 507, respectively); and software (not shown in FIG. 5) for converting between a set of defined coordinate systems, such as the device, modeling and database coordinate systems depicted in FIG. 5 at 580, 585 and 590 (with the various coordinate systems being defined as set forth hereinbefore).

The data capture utility 501 may be used to capture data input to GIS 300 via Enabler Services 301, by, for example, the aforementioned mouse pointing to a river bed and tracing the river over a screen coupled to GIS 300.

Data model editor 502 may, for example, be used to perform a data analysis function which involves obtaining a solutions to the aforementioned minimum distance determination problems.

Polygon formation section 503 and polygon query section 504, may be used to literally form polygons given a set of data points, to analyze data in such a way as to answer questions such as "How close is the nearest fire hydrant to a piece of property represented by a given polygon?",etc Network trace section 505 may be used, for example, to determine the shortest path between two nodes in a given network.

The linear geometry utility package 506 depicted in FIG. 5 may, for example, be used to compute the distance between two or more points, solve minimum distance determination problems, etc., when called upon to do so by, for example, data model editor 502. Likewise, polygon geometry utility package 507, may, for example, be used to compare the area of parcels, determine the length of the perimeter of an object, etc.

The known processes for distinguishing between vector data images and raster data images (hardware oriented blanking and clipping schemes, etc., as described hereinbefore), do not utilize any utilities like those found in the Enabler Services portion 301 of GIS 300 (usually implemented in software), to achieve their objectives.

By way of contrast, as will become clear with reference to the description of the invention being set forth herein, the present invention takes advantage of a utility like color manager 506 in the exemplary system, and a color table stored as a data set in, for example, color specification storage means to which the color manager is coupled, to distinguish between vector data images and raster data images displayed on a CRT. In fact, according to one embodiment of the invention, color manager 506 (under user control), in the exemplary system, is used as color specification modification means. In other words, color manager 506 is used to modify color table entries associated with raster data, vector data, or both, under user control, to affect the brightness of displayed data images.

Figures 4, 7:
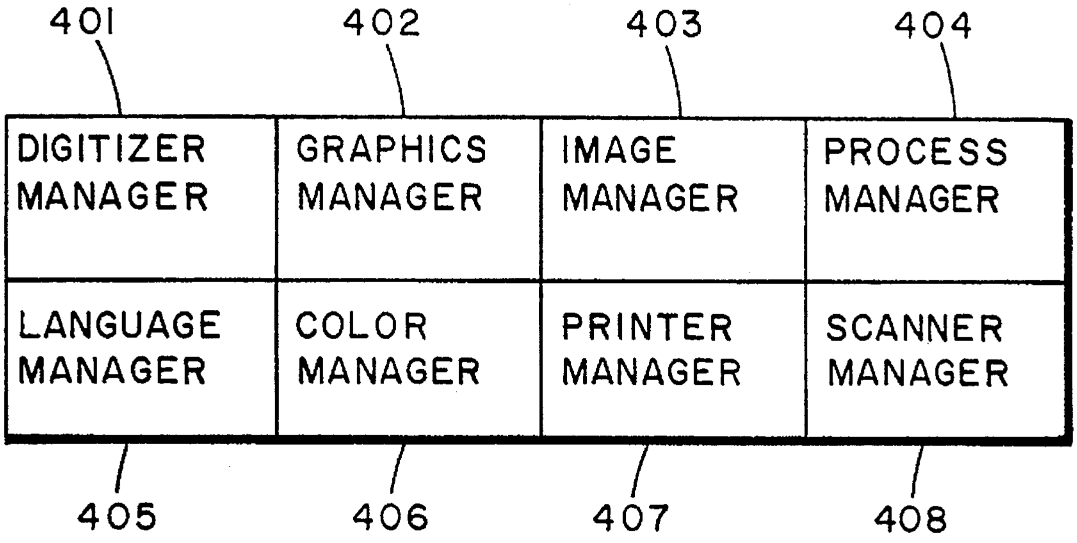
FIG. 4 depicts in greater detail the Enabler Services portion of the exemplary GIS system depicted in FIG. 3. In particular.
FIG. 7 depicts a set of exemplary prior art graphics commands which are executed and re-executed in a display subsystem to continuously update and refresh the image displayed on a display device.
Figure 6:
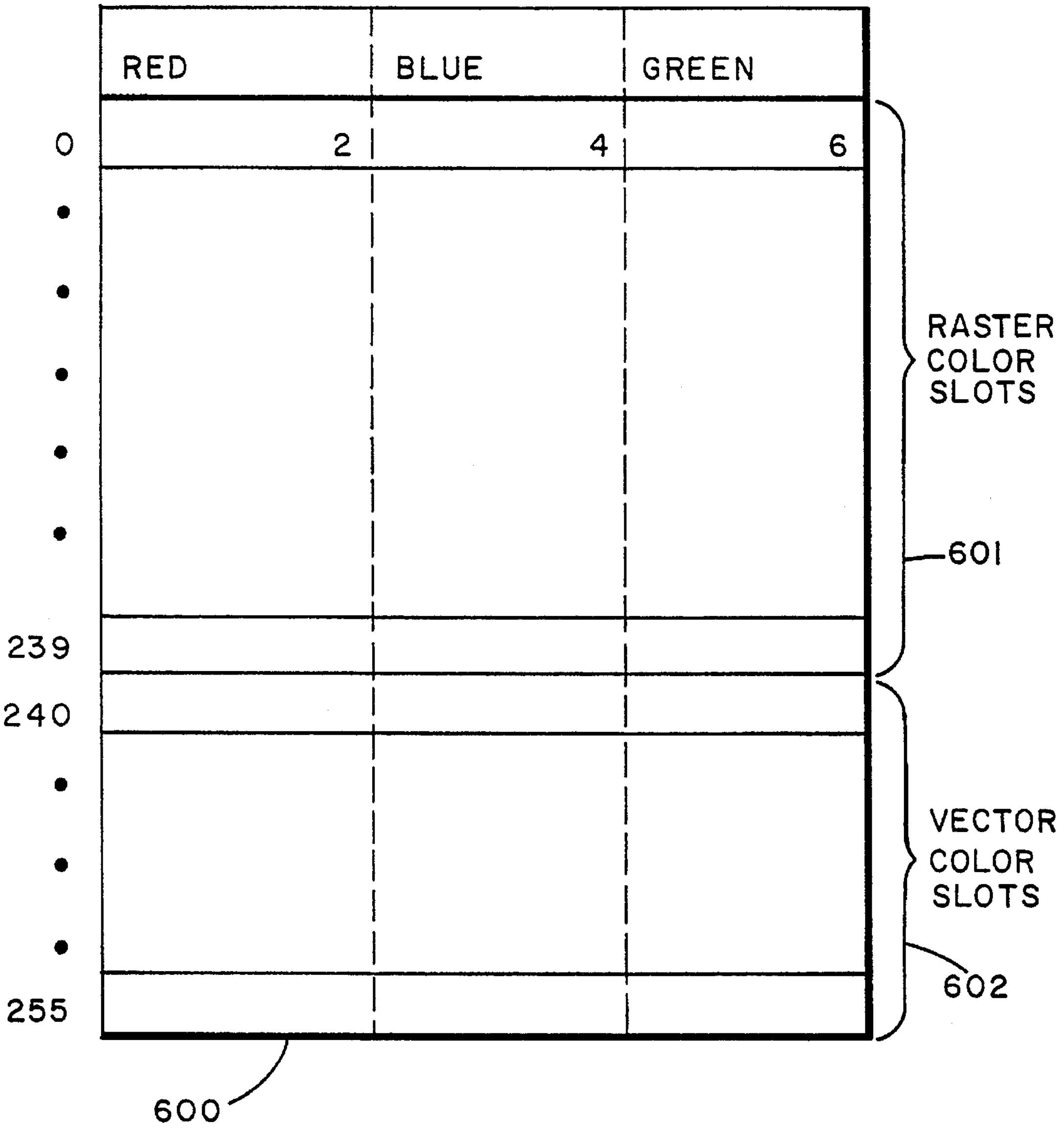
FIG. 6 depicts an exemplary color table that includes color specification entries for both raster data and vector data. The color table depicted in FIG. 6 is typically stored in memory accessible by the color manager depicted in FIG. 4, with the memory being an example of the color specification storage means referred to hereinafter.

Before describing an illustrative embodiment of the invention per se, reference should be made to FIGS. 6–7 which depict an exemplary color table that includes color specification entries for both raster data and vector data (FIG. 6), and a set of exemplary prior art graphics commands (shown in FIG. 7) which are executed and re-executed in a display subsystem to continuously update and refresh the image displayed on a display device.

The illustrative color table 600 shown in FIG. 6, is divided into two portions (which could of course be separate tables as well), a first portion, 601, in which all the entries (slots) are reserved for specifying the color of raster data; and a second portion, 602, in which all the slots are reserved for specifying the color of vector data.

As indicated hereinabove, a partitioned color table in which raster and vector data are intentionally stored in mutually exclusive portions of the table, like table 600, is (according to the teachings of the invention and not the prior art) typically stored in a data set in storage means (referred to herein as color specification storage means) associated with a display subsystem.

The use of such tables for storing entries which are associated with "typed data" (specifically refresh and non-refresh data) is well known and is used, for example, in the commercially available IBM GPG GIS system, running on the IBM 5080, referred to hereinabove. By way of contrast, the prior art does not teach or suggest the use of a color entry table partitioned into mutually exclusive sets of raster and vector data entries for any purpose, let alone for the purpose of controlling brightness. Those skilled in the art will readily appreciate that there is no correlation between refresh/non-refresh data and raster/vector data. For example, vector data can be both refresh and non-refresh data and the same holds true for raster data.

The illustrative color table depicted in FIG. 6 goes on to show a table structure similar to the one described in the aforementioned Burke et al reference, i.e., a structure where each entry includes a byte for specifying the intensity of the red, blue and green content of data being displayed. Color tables, such as the one depicted in FIG. 6, facilitate the sequential assignment of a particular intensity and hue for each pixel being illuminated by a display subsystem on a display surface.

The red, blue and green components of each color specification entry (i.e., the bytes referred to in the Burke et al patent), are also shown in FIG. 6, with the illustrative values "2", "4" and "6" being stored in slot 0 (one of the 240 slots to which raster data may be assigned using the illustrative table 600).

Reference should now be made to FIG. 7 which, as indicated hereinabove, depicts a set of exemplary prior art graphics commands which are executed and re-executed in a display subsystem to continuously update and refresh the images displayed on a display device. Suitable commercially available applications programming interfaces for processing the exemplary commands depicted in FIG. 7 are GASP and graPHIGS ("GASP" and "graPHIGS" are trademarks owned by the International Business Machines Corporation).

The command types depicted in FIG. 7 allow users to interact with a graphics system and, for example, enable a user to draw an image (utilizing the depicted raster command "draw_image (the Image)"), which, in the exemplary GPG GIS system in which the invention is being described, results in an array of 1024×1024 bytes, with each byte having a number which corresponds to an index into the aforementioned color table.

A command like "draw_image (the Image)", would, according to the illustrative GPG GIS system in which the invention is being described, be initially processed by the aforementioned image manager 403 (shown in FIG. 4), and then be processed by the aforementioned GASP interface (sometimes referred to hereinafter as a graPHIGS type interface) which creates the rendering to be displayed on the display screen. The graPHIGS type interface also maintains the commands that are being executed in a display list buffer. The commands being processed are continually executed and reexecuted by a facility such as GASP or graPHIGS, to refresh a frame buffer located, in the exemplary IBM system 5080 context, in the display subsystem.

Before actually causing an image to be drawn, the graPHIGS type interface utilizes the aforementioned index values into the color table to look up the color specification information stored in the color table. In this manner the color value to be displayed at each pixel is ascertained by the graPHIGS type interface and placed into the frame buffer each display cycle.

Also shown in FIG. 7 are exemplary vector commands, such as "set_color (slot 250)", which allows a color in a particular slot in table 600 to be set to a user specified value; "draw_line (0,0,100,100)", which allows the user to specifying the endpoints of a line segment (in this case (0,0) and (100,100)) to be drawn by, for example, a graPHIGS type interface; and "draw_point (90 90)", which allows the user to specifying a point (in this case (90,90)) to be drawn. According to the illustrative GPG GIS system in which the invention is being described, vector type commands would be initially processed by the aforementioned graphics manager 402 (shown in FIG. 4), and then be processed by the aforementioned graPHIGS type interface which creates the line, point, etc., to be displayed on the display screen.

Having described a commercially available modeling system (in particular a GIS system) in which the invention may be practiced, with specific reference to exemplary sections of the Enabler Services portion 301 of GIS 300 where raster and vector data are managed for display purposes; attention will now be directed to how the invention may be applied to visibly distinguish raster and vector data images that are simultaneously visible on a display device.

Figure 8:
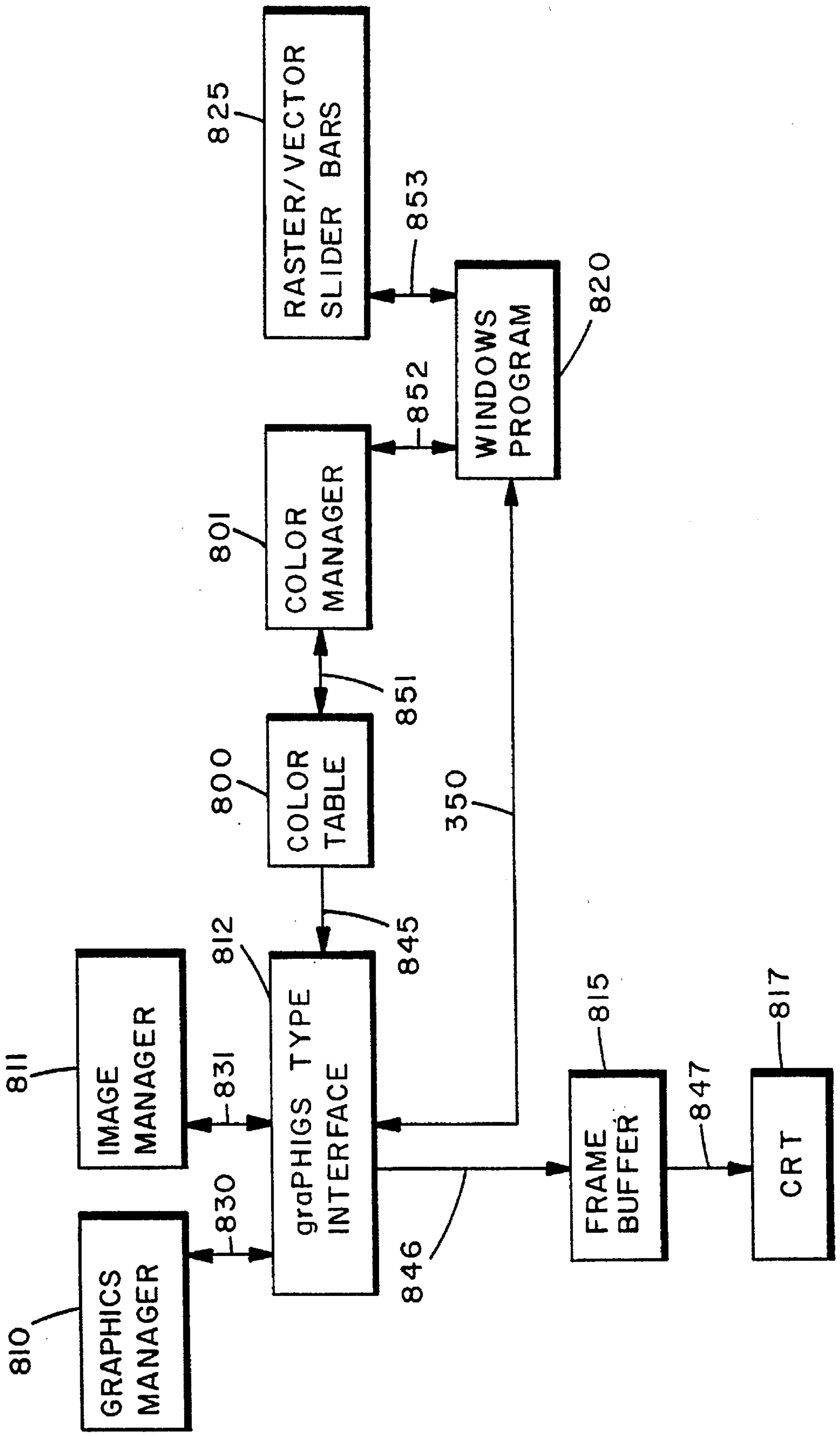
FIG. 8 depicts a prior art hardware configuration which supports a preferred embodiment of the present invention. Such a configuration includes software, in the depicted color manager, operating in accordance with the teachings set forth herein, to modify color specification entries in (for example) the color table depicted in FIG. 6.

Reference should now be made to FIG. 8 which depicts a hardware configuration which specifically supports an illustrative embodiment of the present invention. According to the illustrative embodiment of the invention, software included in the depicted color manager 801 (corresponding to color manager 406 from FIG. 4), is used, in the manner taught hereinafter, to modify color specification entries in the depicted color table 802, which may, for example, be structured like color table 600 shown in FIG. 6.

The system depicted in FIG. 8 includes the following components:

(1) a graphics manager 810, which may be realized by the graphics manager 402 referred to hereinabove (with reference to FIG. 4), available as part of the commercially available GPG GIS system;

(2) an image manager 811, which may be realized by the image manager 403 referred to hereinabove (with reference to FIG. 4), available as part of the commercially available GPG GIS system;

(3) the commercially available graPHIGS type interface, 812,, referred to hereinabove, which may, for example, be run on an IBM PS/2 computing system;

(4) the aforementioned color table 800, included as part of most commercially available color graphic display subsystems;

(5) the aforementioned color manager 801, included, for example, as part of the Enabler Services 301 portion of commercially available GIS systems, such as the GPG GIS described hereinbefore with reference to FIGS. 3–5.

(6) Frame buffer 815 and CRT 817, included as part of most commercially available color graphic display subsystems; and (7) a utility package, such as the aforementioned Microsoft Windows version 3.1, (shown in FIG. 8 at 820), which allows a user to visualize control elements such as software generated slider bars, control knobs, etc., displayed on CRT 817.

The control elements generated by the user control utility (such as Windows), are represented in block 825 of FIG. 8; however, as those skilled in the art will readily appreciate, the actual images of the control element(s) are output to CRT 817 via the Windows/graPHIGS type interface, 350, depicted in FIG. 8. Also, those skilled in the art will recognize the ability to generate control elements for display purposes and to react to user inputs via these elements, could be resident in another utility, such as (for example) illustrative color manager 801, without departing from the scope or spirit of the present invention.

According to the invention, color table 800, color manager 801, a utility (such as Windows) shown at 820, and the control elements represented by 825, are the key components which can be placed in combination in existing graphics systems, without having to modify or add any hardware, to allow a user to visually separate raster and vector data images by modifying the color specifications stored for these data types in color table 800.

In FIG. 8, color table 800 is shown coupled to color manager 801 via link 851; color manager 801 is shown coupled to the exemplary Windows program (820) via link 852; and the utility at block 820 (e.g., Windows), is shown coupled to the control elements depicted in block 825 via link 853 (with the actual images being sent to CRT 817 via link 850 as explained hereinabove).

According to an illustrative embodiment of the invention, the Windows program (for example), using well known techniques, can be used to display a pair of software generated slider bars on the display screen. One of these bars may be arbitrarily assigned for the control of raster data, while the other bar is assigned for the control of vector data.

Assuming the bars are set at an initial position recognized by the Windows program; any movement by the user of a given bar in one direction may be used to signal that the user wishes to increase the intensity of the data type controlled by the particular slider bar; while movement in the opposite direction may be used to signal that the user wishes to decrease the intensity of the data type controlled by that same slider bar. Such an arrangement would allow for independent control of the brightness of the displayed data types.

Figure 9:
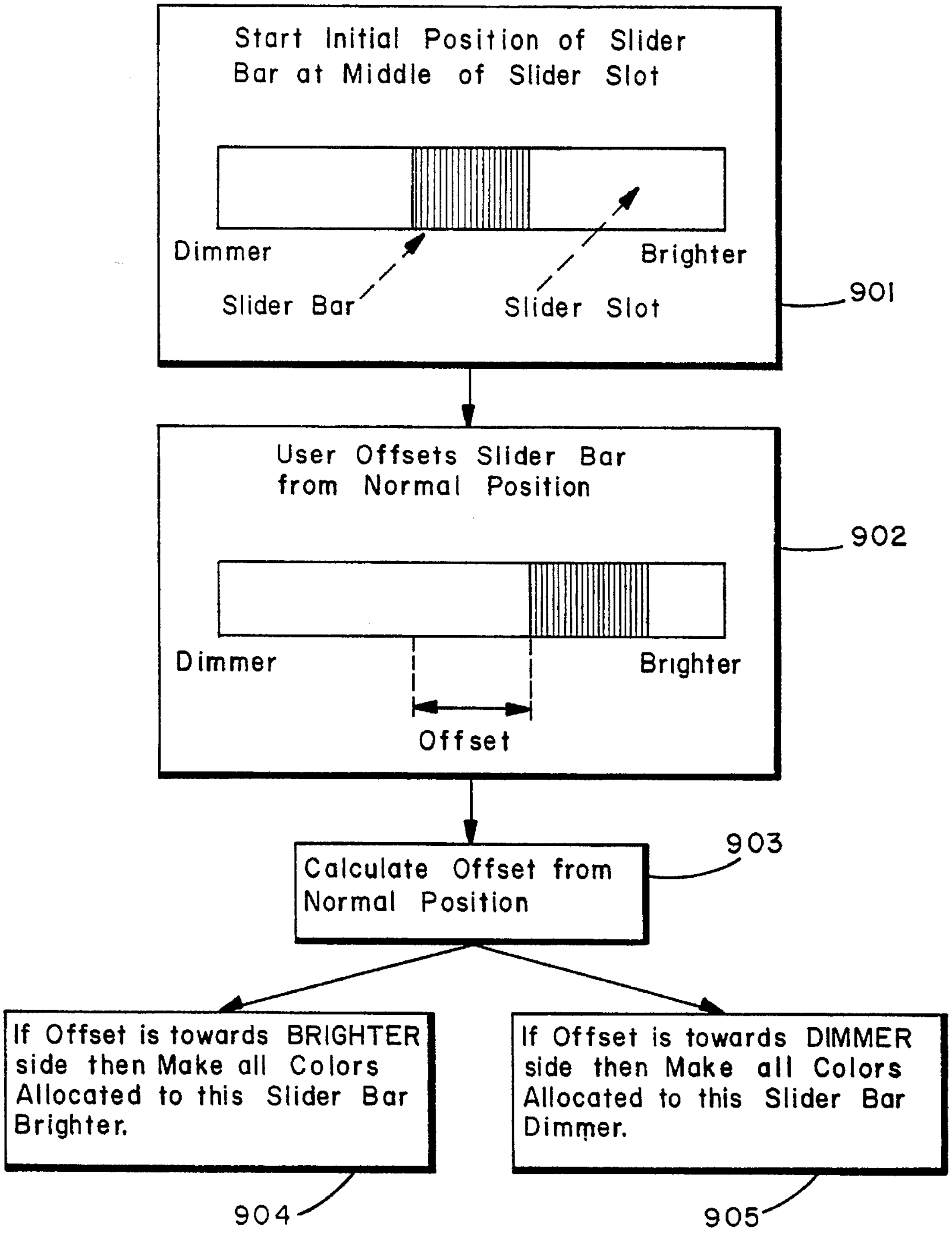
FIG. 9 depicts how a slider bar may be used, in accordance with one embodiment of the invention, to control the bright of displayed data images.

FIG. 9 depicts how a slider bar (or bars) may be used, in accordance with one embodiment of the invention, to control the brightness of displayed data images. The example depicted in FIG. 9 shows the slider bar for controlling one data type (say raster data), in an initial start position as shown on the display image represented in block 901. This image can, as indicated hereinabove, be generated and controlled using a utility such as Windows.

Should the user cause the slider bar to be offset, such as depicted in block 902 of FIG. 9, a utility (such as the Windows utility shown at block 820 of FIG. 8), could, calculate the offset of the bar from its normal position (as shown at block 903 of FIG. 9). Once such an offset is calculated, the utility would inform color manager 801 (via link 852) of any change and then color manager 801 would make all colors allocated to (controlled by) the slider bar, brighter or dimmer (as shown at blocks 904 and 905 of FIG. 9, respectively), based on the user having offset the slider bar in a given direction. This can be accomplished, according to the invention, by adjusting all of the color table entries stored in color specification storage means (in which color table 800 is stored), by an adjustment factor.

The adjustment factor could be a fixed quantity, a variable dependent on the degree of offset of the slider bar from the normal position, etc. In any event, what is important is that all of the color table entries, for the data type under the control of a defined control element, be modified in response to the user control signal generated when, for example, a slider bar is moved.

An alternative embodiment of the invention contemplates only a single slider bar or other control element being presented to the user, with the color table entries associated with one of the data types (such as vector data) all being adjusted in one direction (positively or negatively depending on the direction or movement of the control element); while all of the color table entries associated with the other data type are adjusted in the opposite direction for the same movement of the control element. Many variations on the amount of adjustment, whether adjustments are made independently, dependently, etc., can be envisioned by those skilled in the art without departing from the scope or spirit of the invention which focuses on modifying (adjusting) all of the color specification entries assigned to a given data type, upon recognition of a control signal generated by a user (or evenn program generated) request.

The required adjusting of color table entries can, according to one embodiment of the invention, be implemented by the aforementioned color manager 801 (an example of color specification modification means), utilizing a simple increment/decrement scheme.

In response to a first signal generated by a given control element (for example, when a slider bar as depicted in FIG. 9 (at 902) is moved to the right), all of the color specification entries under the control of that slider bar could be incremented by a fixed amount; a second control signal generated when the bar is moved in the opposite direction, could be used to cause all of the color specification entries under the control of that slider bar to be decremented, etc. A corresponding third and fourth signal could be used for a second slider bar controlling color table entries associated with the other data type.

The aforementioned increment/decrement scheme (whether fixed adjustment factors or variable adjustment factors are used), may be easily implemented by those skilled in the art using simple hardware control logic or, according to the preferred embodiment of the invention, software. All that need be done (in one example) is to recognize the presence of an input brightness control signal (e.g., by the software checking a status bit or counter set or modified by the presence of the control signal); and then, for example, incrementing each color table entry for the affected data type by an adjustment factor associated with the control signal whenever such signal is present.

Further reference should be made to FIG. 8 which shows all the elements of an exemplary system for supporting the invention, and how these elements cooperate.

As indicated hereinabove, graphics manager 810 and image manager 811, both found in commercially available GIS systems, may be used to communicate with a commercially available graPHIGS type interface, to process both raster and vector commands (such as those depicted in FIG. 7). Manager 810 and 811 are shown coupled to graPHIGS type interface 812, via links 830 and 831 respectively.

As indicated hereinabove, a graPHIGS type interface 812 may be run on an IBM PS/2 system, and is used to place the image to be displayed for the upcoming frame into frame buffer 815 (part of the display subsystem).

Since the graPHIGS type interface is continuously executing the display program (set of display commands) stored in the display list buffer referred to hereinabove (not shown in FIG. 8, but part of the display subsystem); if a change occurs in color table values, these changes are reflected by graPHIGS type interface input to the frame buffer (as explaoned hereinabove) during the frame following the frame in which the changes are made to the color table (by, for example, color manager 801 in the manner described hereinbefore), and images with their brightness having been varied are displayed on CRT 817 during the next display frame.

This brightness modification of data images appearing on CRT 817 appears to be happening in real time to a user manipulating the control elements (block 825 of FIG. 8) and viewing CRT 817.

This is because each display cycle, with the graPHIGS type interface executing the commands in the display list buffer, the interface indexes into color table 800 to determine color specification values, via link 845 shown in FIG. 8. If the values in the color table associated with one or more data types has changed; then the new color (a brighter one, or dimmer one for each pixel illuminated with the color specified by a modified color table entry), is output to frame buffer 815 (by graPHIGS type interface 812 via link 846); for display on CRT 817 (via link 847).

Thus, according to one embodiment of the invention, color table entries may be modified by user action with the result that the user may be able to distinguish data type images (such as raster data images from vector data images), based on the brightness of the images appearing on CRT 817.

Figure 10:
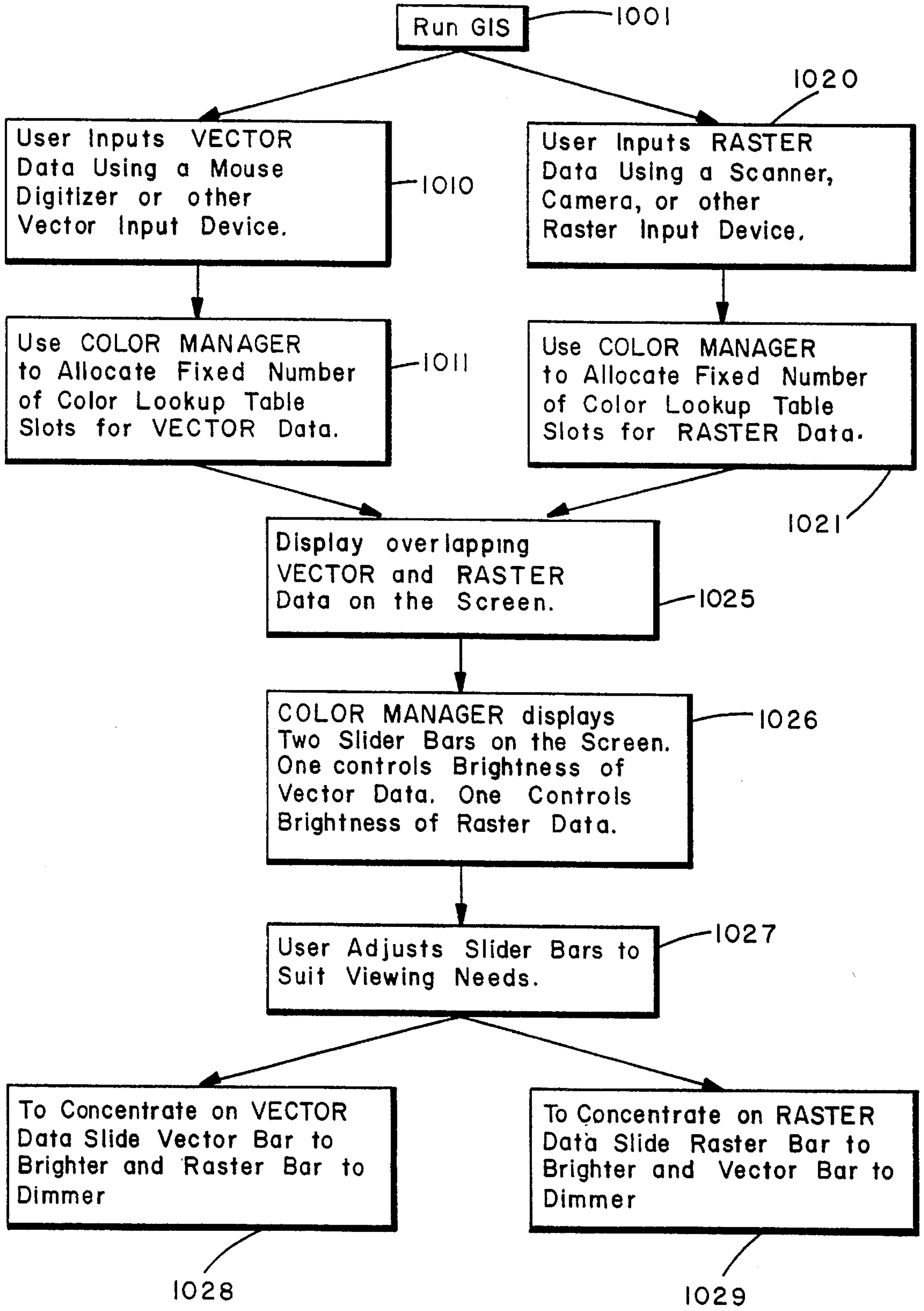
FIGS. 10 depicts, in the form of a summary flow chart, the user interaction and resulting process steps contemplated by a preferred embodiment of the invention.

Finally, reference should be made to FIG. 10 which depicts, in the form of a summary flow chart, the user interaction and resulting process steps contemplated by a preferred embodiment of the invention.

In particular, FIG. 10 depicts an exemplary GIS environment (shown at block 1001), under which a user may input vector and raster commands as shown at blocks 1010 and 1020 respectively.

In either case, a color manager is presumed to allocate a fixed number of slots in a color table for vector data and a fixed number of slots for raster data as shown at blocks 1011 and 1021, respectively. Those skilled in the art will recognize that some systems may even allow for a variable number of slots to be used for different data type assignments. In these situations, any software or logic developed to modify all of the data under the control of a given control element, would have to be informed of any changes in slot assignments between data types so that the adjustment factor(s) used in response to input control signal(s) would be used to modify the appropriate color table entries.

FIG. 10 goes on to show a display of overlapping vector and raster data on a screen taking place at block 1025.

Block 1026 of FIG. 10 indicates that a color manager (or other utility, such as the aforementioned Windows utility in combination with a preexisting color manager), display slider bars on the screen. According to the illustrative embodiment of the invention being described, one of the bars is for the control of the brightness of raster data; while the other bar is for the control of the brightness of vector data.

The user is shown to adjust the slider bars to suit viewing needs, at block 1027 of FIG. 10.

Finally, blocks 1028 and 1029 of FIG. 10 indicate that if the user wishes to concentrate on vector data, the bar used to control vector data is positioned to make vector data brighter and the bar used to control raster data is positioned to make such data dimmer (block 1028); while the opposite scenario is presented at block 1029. Obviously, the user may manipulate one of the bars or both to suit viewing needs.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. A method for enabling images on a display screen generated from raster data to be visually distinguished from images on the same screen generated from vector data, in a modeling system that includes a color table partitioned into a first set of color table entries each dedicated exclusively for specifying the color of raster data and a mutually exclusive second set of color table entries each dedicated exclusively for specifying the color of vector data, comprising the steps of:

(a) controlling the brightness of raster data images on said screen directly in response to a first control signal, generated in real time by a first control means, which causes all of the entries located in said first set of color table entries to be incrementally modified simultaneously to thereby adjust the brightness of all raster data images displayed during a given display cycle, via a single user operation in which color table entry modification is transparent to the user; and (b) controlling the brightness of vector data images on said screen directly in response to a second control signal, generated in real time by a second control means, which causes all of the entries located in said second set of color table entries to be incrementally modified simultaneously to thereby adjust the brightness of all vector data images displayed during a given display cycle via a single user operation in which color table entry modification is transparent to the user, whereby the user is able to view an animated color differentiation between vector and raster data as the user adjusts vector and/or raster data image brightness.

2. A method as set forth in claim 1 wherein said step of controlling the brightness of raster data images in response to said first control signal further comprises the step of modifying all color table entries specifying the color of raster data in said system by a first adjustment factor.

3. A method as set forth in claim 2 wherein said first adjustment factor is added to the red, green and blue components of each color table entry specifying the color of raster data in said system to increase the brightness of raster data.

4. A method as set forth in claim 2 wherein said first adjustment factor is subtracted from the red, green and blue components of each color table entry specifying the color of raster data in said system to decrease the brightness of raster data.

5. A method as set forth in claim 2 wherein said first adjustment factor is a variable quantity.

6. A method as set forth in claim 2 wherein said first adjustment factor is a fixed quantity.

7. A method as set forth in claim 1 wherein said step of controlling the brightness of vector data images in response to said second control signal further comprises the step of modifying all color table entries specifying the color of vector data in said system by a second adjustment factor.

8. A method as set forth in claim 7 wherein said second adjustment factor is added to the red, green and blue components of each color table entry specifying the color of vector data in said system to increase the brightness of vector data.

9. A method as set forth in claim 7 wherein said second adjustment factor is subtracted from the red, green and blue components of each color table entry specifying the color of vector data in said system to decrease the brightness of vector data.

10. A method as set forth in claim 7 wherein said second adjustment factor is a variable quantity.

11. A method as set forth in claim 7 wherein said second adjustment factor is a fixed quantity.

12. A method for distinguishing raster data display images from vector data display images in a modeling system in which both raster data and vector data display images are simultaneously viewable on the same display window, wherein said system includes a cathode ray tube (CRT) having a defined display window, a color table for storing color specifications assigned to data to be displayed on said CRT, wherein said color table is partitioned into a first set of color table entries each dedicated exclusively for specifying the color intensity of raster data and a mutually exclusive second set of color table entries each dedicated exclusively for specifying the color intensity of vector data, a color manager for modifying color table entries in response to user input control signals, control means for inputting said control signals, a graphics manager for processing vector commands, and an image manager for processing raster commands, comprising the steps of:

(a) predefining said first set of color table entries and predefining second set of color table entries;

(b) increasing simultaneously in real time the color intensity of all of the entries in said first set of color table entries via said color manager directly in response to a first control signal input to said color manager by the user via said control means to thereby increase the brightness of all raster data images displayed during a given display cycle, via a single user operation in which color table entry modification is transparent to the user;

(c) decreasing simultaneously in real time the color intensity of all of the entries in said first set of color table entries via said color manager directly in response to a first control signal input to said color manager by the user via said control means to thereby decrease the brightness of all raster data images displayed during a given display cycle, via a single user operation in which color table entry modification is transparent to the user;

(d) increasing simultaneously in real time the color intensity of all of the entries in said second set of color table entries via said color manager directly in response to a second control signal input to said color manager by the user via said control means to thereby increase the brightness of all vector data images displayed during a given display cycle, via a single user operation in which color table entry modification is transparent to the user;

(e) decreasing simultaneously in real time the color intensity of all of the entries in said second set of color table entries via said color manager directly in response to a second control signal input to said color manager by the user via said control means to thereby decrease the brightness of all vector data images displayed during a given display cycle, via a single user operation in which color table entry modification is transparent to the user, whereby the user is able to view an animated color differentiation between vector and raster data as the user adjusts vector and/or raster data image brightness.

13. A method as set forth in claim 12 further comprising the steps of:

(a) periodically refreshing said CRT to display vector and raster images corresponding to the vector and raster commands processed by said graphics manager and image manager; and (b) updating said display to adjust the brightness of display images starting with a refresh cycle following the color intensity in said color table having been modified for at least one data type, thereby allowing a user to distinguish between vector data images and raster data images being displayed.

14. A method for selectively controlling the brightness of raster data images and vector data images on a display screen in a computer graphics system that includes a color table partitioned into a first set of color table entries each dedicated exclusively for specifying the color of raster data and a mutually exclusive second set of color table entries each dedicated exclusively for specifying the color of vector data, comprising the steps of:

(a) inputting a user request to said system to change the brightness of either said raster data, said vector data or both said raster data and said vector data being displayed on said screen in real time; and (b) simultaneously incrementally modifying all color table entries in said first set of color table entries whenever the input user request is to change the brightness of raster data, simultaneously incrementally modifying all color table entries in said second set of color table entries whenever the input user request is to change the brightness of vector data and simultaneously incrementally modifying all color table entries in both said first and second set of color table entries whenever the input user request is to change the brightness of both raster and vector data, to thereby adjust the brightness of data images displayed during a given display cycle enabling the user to view an animated color differentiation between vector and raster data as the user adjusts vector and/or raster data image brightness.

15. A method as set forth in claim 14 further comprising the steps of:

(a) generating a first control signal in response to a user request to modify the brightness of said raster data image; and (b) generating a second control signal in response to a user request to modify the brightness of said vector data image.

16. A method as set forth in claim 15 wherein said step of modifying further comprises the step of adjusting the brightness of raster data images in response to said first control signal by modifying all color table entries specifying the color of raster data in said system by a first brightness adjustment factor.

17. A method as set forth in claim 16 wherein said first brightness adjustment factor is added to the red, green and blue components of each color table entry specifying the color of raster data in said system to increase the brightness of raster data.

18. A method as set forth in claim 16 wherein said first brightness adjustment factor is subtracted from the red, green and blue components of each color table entry specifying the color of raster data in said system to decrease the brightness of raster data.

19. A method as set forth in claim 16 wherein said first adjustment factor is a variable quantity.

20. A method as set forth in claim 16 wherein said first adjustment factor is a fixed quantity.

21. A method as set forth in claim 15 wherein said step of modifying further comprises the step of adjusting the brightness of vector data images in response to said second control signal by modifying all color table entries specifying the color of vector data in said system by a second brightness adjustment factor.

22. A method as set forth in claim 21 wherein said second brightness adjustment factor is added to the red, green and blue components of each color table entry specifying the color of vector data in said system to increase the brightness of vector data.

23. A method as set forth in claim 21 wherein said second brightness adjustment factor is subtracted from the red, green and blue components of each color table entry specifying the color of vector data in said system to decrease the brightness of vector data.

24. A method as set forth in claim 21 wherein said second brightness adjustment factor is a variable quantity.

25. A method as set forth in claim 21 wherein said second brightness adjustment factor is a fixed quantity.

26. Apparatus for distinguishing raster data display images from vector data display images in a computer graphics system in which both raster data and vector data display images are simultaneously viewable on the same display window, wherein said system includes a cathode ray tube (CRT) having a defined display window, a vector command processor, a raster command processor, and further wherein a first set of color intensity specifications are defined for raster data and a second mutually exclusive set of color intensity specifications are defined for vector data, comprising:

(a) partitioned color specification storage means, for storing said first and second mutually exclusive sets of color specifications assigned to data to be displayed on said CRT, wherein said color specification storage means is initialized with said first and second mutually exclusive sets of color specifications;

(b) user input control means for inputting a user request to said system, in the form of at least one brightness control signal, to change the brightness of either said raster data, said vector data or both said raster data and said vector data displayed in said display window in real time; and (c) color specification modification means, for modifying color specification storage means entries in response to said at least one brightness control signal, operative to incrementally modify all the entries in said first set of color specifications stored in said color specification storage means simultaneously in real time whenever said at least one control signal indicates that the brightness of raster data is to be modified, and operative to incrementally modify all the entries in said second set of color specifications stored in said color specification storage means simultaneously in real time whenever said at least one control signal indicates that the brightness of vector data is to be modified, to thereby adjust the brightness of data images displayed during a given display cycle enabling the user to view an animated color differentiation between vector and raster data as the user adjusts vector and/or raster data image brightness.

27. Apparatus as set forth in claim 26 wherein said color specification modification means further comprises means for adding a brightness adjustment factor to the red, green and blue components of each color specification storage means entry in said first set of color specification entries to increase the brightness of raster data.

28. Apparatus as set forth in claim 26 wherein said color specification modification means further comprises means for subtracting a brightness adjustment factor from the red, green and blue components of each color specification storage means entry in said first set of color specification entries to decrease the brightness of raster data.

29. Apparatus as set forth in claim 26 wherein said color specification modification means further comprises means for adding a brightness adjustment factor to the red, green and blue components of each color specification storage means entry in said second set of color specification entries to increase the brightness of vector data.

30. Apparatus as set forth in claim 26 wherein said color specification modification means further comprises means for subtracting a brightness adjustment factor from the red, green and blue components of each color specification storage means entry in said second set of color specification entries to decrease the brightness of vector data.

31. Apparatus as set forth in claim 26 wherein said color specification modification means is operative to modify said color specification storage means entries by a brightness adjustment factor that is a variable quantity.

32. A method as set forth in claim 26 wherein said color specification modification means is operative to modify said color specification storage means entries by a brightness adjustment factor that is a fixed quantity.

33. Apparatus as set forth in claim 26 wherein said user input control means comprises a visible control appearing in the graphic field of view in said display window.

34. Apparatus as set forth in claim 33 wherein said visible control appearing in said display window is a software generated slider bar.

35. Apparatus as set forth in claim 33 wherein said visible control is a software generated dial widget.

36. Apparatus as set forth in claim 26 further comprising:

(a) means for periodically refreshing said CRT to display vector and raster images corresponding to vector and raster commands processed by said vector command processor and said raster command processor; and (b) means for updating said display to adjust the brightness of display images starting with a refresh cycle following the time period during which color intensity in said color specification storage means is modified.

* * * * *

UNITED STATES PATENT AND TRADEMARK OFFICE

CERTIFICATE OF CORRECTION

PATENT NO. : 5,499,325

DATED : Mar. 12, 1996

INVENTOR(S) : Robert F. Dugan, Jr.

It is certified that error appears in the above-indentified patent and that said Letters Patent is hereby corrected as shown below:

Column 12, line 55 — The following paragraph should be inserted after line 55:

-- By way of further contrast, the color table contemplated by the present invention (illustrated by way of example with reference to FIG. 6), is partitioned into mutually exclusive sets of raster and vector. In particular, FIG. 6 illustrates an example of the partitioned color table structure contemplated by the invention; one in which a preponderance of the entries are associated with raster data color assignments (for example, slots 0-239 as shown in table 600), with the remaining slots being used for vector data color assignments (for example, slots 240-255 as shown in table 600.--.

Signed and Sealed this

Twenty-fourth Day of September, 1996

Attest:

BRUCE LEHMAN

*Attesting Officer* — *Commissioner of Patents and Trademarks*